Jan. 21, 1958 R. OBERLE 2,820,565
LOCKABLE BOTTLE OR LIKE CONTAINER
Filed Oct. 5, 1956 2 Sheets-Sheet 1
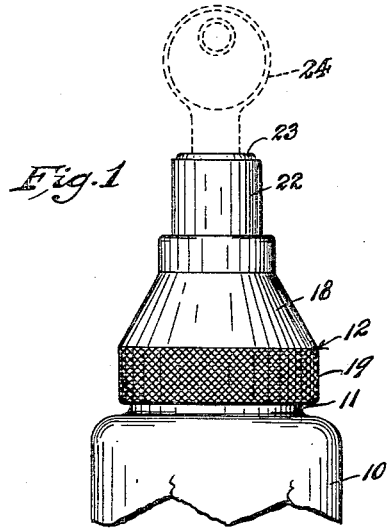
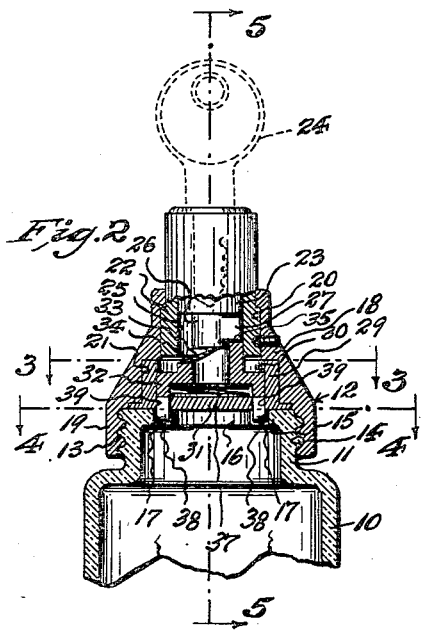
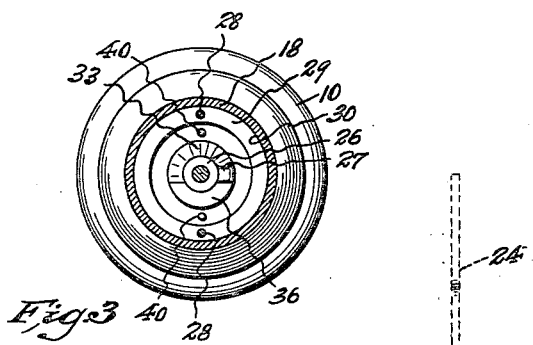
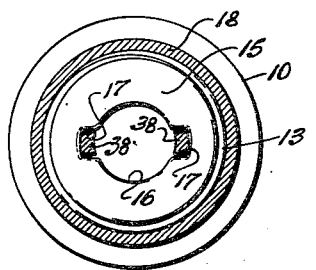
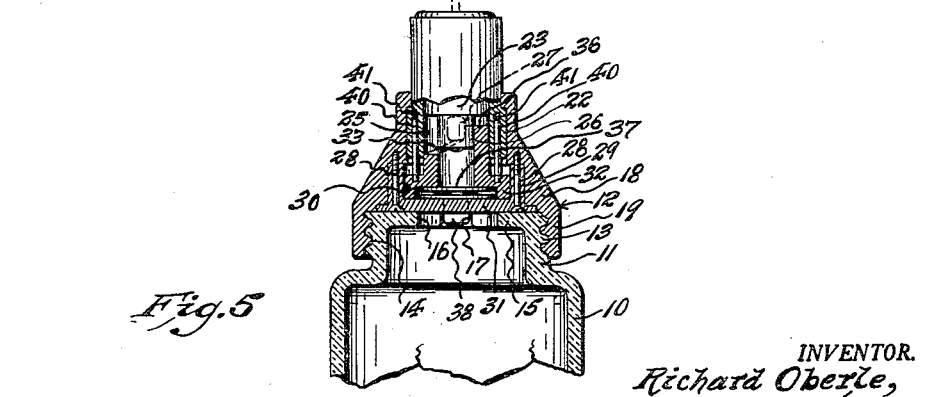
INVENTOR.
Richard Oberle,
BY Richards & Cifelli,
Attorneys Jan. 21, 1958 R. OBERLE 2,820,565
LOCKABLE BOTTLE OR LIKE CONTAINER
Filed Oct. 5, 1956 2 Sheets-Sheet 2
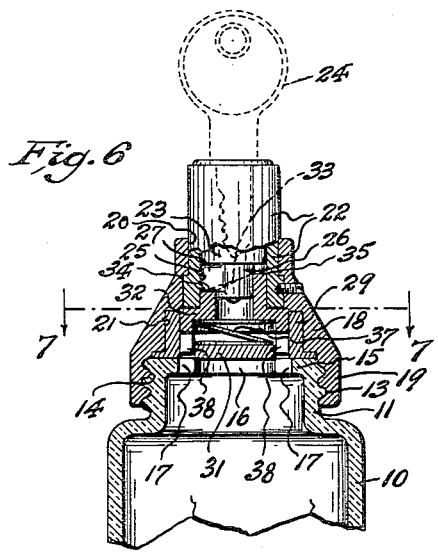
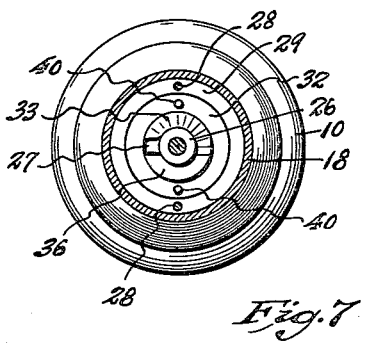
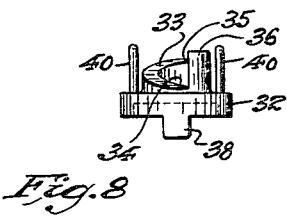
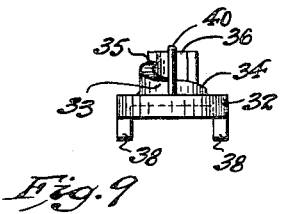
INVENTOR.
Richard Oberle,
BY Richards & Cifelli,
Attorneys

United States Patent Office 2,820,565
Patented Jan. 21, 1958

2,820,565

LOCKABLE BOTTLE OR LIKE CONTAINER

Richard Oberle, Brooklyn, N. Y., assignor to National Hardware Corporation, a corporation of New York Application October 5, 1956, Serial No. 614,163

4 Claims. (Cl. 215—98)

This invention relates to a bottle or like container equipped with a lockable closure means.

The invention has for an object to provide a bottle or like container having a detachable closure means including key actuatable mechanism for locking the same to the container, whereby to prevent unauthorized dispensing of the content from said container or surreptitious tampering with said content.

The invention has for a further object to provide a bottle or like container and a detachable closure cap therefor, the neck of said container and the closure cap having cooperative means, operative by rotation of the latter relative to the former, to join said cap in closed relation to the container; the container neck being further provided with bolt receivable means and the closure cap having an axially movable bolt means cooperative therewith, and key actuatable means for operating said bolt means.

The above and other objects will become apparent from the following detailed description of this invention when read in connection with the accompanying drawings showing an illustrative embodiment of the invention, in which drawings:

Fig. 1 is a side elevational view of a bottle or like container equipped with a key controlled lockable closure cap, according to this invention, shown in locked condition, the bottom portion of the bottle or like container being broken away; Fig. 2 is a central vertical longitudinal sectional view of the same; Fig. 3 is a horizontal sectional view, taken on line 3—3 in Fig. 2; Fig. 4 is another horizontal sectional view, taken on line 4—4 in Fig. 2; and Fig. 5 is another vertical longitudinal sectional view of the same, taken on line 5—5 in Fig. 2.

Fig. 6 is a central vertical longitudinal sectional view similar to that of Fig. 2, but showing the key controlled lockable closure cap in unlocked condition; and Fig. 7 is a horizontal sectional view of the same, taken on line 7—7 in Fig. 6.

Fig. 8 is a side elevational view of the bolt piece of the key controlled lockable closure cap; and Fig. 9 is another side elevational view of the same, viewed from the left of Fig. 8.

Referring to the drawings, in which like characters of reference indicate corresponding parts, the reference character 10 indicates the body of a bottle, jar or other container having a neck portion 11 to which a detachable closure cap 12 is adapted to be applied. The container neck portion 11 and the closure cap 12 are provided with cooperative means, operative by rotation of the cap relative to the container, whereby to join said cap to said container. Illustrative of cooperative means for such purpose, the container neck portion 11 is provided with external screw threads 13 or the like, and the cap 12 is provided with internal screw threads 14 or the like. Integral with the free end of the container neck portion 11, and disposed to bridge across the mouth of the same, is an end wall 15 having a central opening 16 to provide an outlet through which the content of the container can be dispensed. Provided in the marginal portion of said opening 16 is at least one bolt receiving notch or socket 17, but preferably two such notches or sockets which are diametrically aligned (see Fig. 4).

The cap 12 is formed to provide a suitably shaped body portion 18 having a skirt portion 19 dependent from its lower or bottom end, in connection with which skirt portion the internal screw threads 14 or the like are provided. Said skirt portion bounds the container neck receiving potion of the cap.

Extending axially downward into the cap body 18, from the top end thereof, is an opening 20. This opening 20 terminates in a downwardly open counterbore 21, which overlies and opens into the interior of the container neck receiving portion of the cap that is bounded by the dependent skirt portion 19. Mounted within said opening 20 of the cap body 18 is a key actuatable lock mechanism, which is preferably of a cylinder lock type, and comprises a stationary lock housing 22, that is suitably affixed to the cap body within said opening 20, and which supports a rotatable key barrel 23. Said key barrel is adapted to receive an actuating key 24; the latter being shown by broken lines in Figs. 1, 2, 5 and 6. The outer end of said key barrel is exteriorly exposed at the outer end of said housing 22, so as to be engageable by said key 24. Affixed to the inner end of the key barrel 23, so as to rotate therewith within the inner open end 25 of the lock housing 22, is a bolt piece operating element 26 which comprises a hub having a thrust arm 27 radially projecting therefrom.

Fixed within the counterbore 21 of the cap body 18, as e. g. by fastening screws 28, or in any other suitable manner, is a bolt piece guide member 29 which is formed to provide an upwardly open internal guideway 30 that is closed at its lower end by a transverse bottom wall 31. Slidably movable axially within said guideway 30 is a bolt piece 32. This bolt piece is provided with an upwardly projecting cam portion 33 that is concentric to its axis, and which is opposed to the thrust arm 27 of the bolt piece operating element 26, subject to operative movement of the latter when the key barrel 23 is turned by the inserted key 24. Said cam portion 33 inclines upwardly from a low point 34 to a high point 35 between opposite sides of a stop projection 36. A compression spring member 37 is interposed between the bolt piece 32 and the bottom wall 31 of the guide member 29. This spring member 37 yieldably urges the bolt piece upwardly, so as to maintain its cam portion 33 in operative engagement with the thrust arm 27 of the bolt piece operating element 26. Dependent from the bolt piece 32 is a bolt tongue or tongues 38 which project downwardly therefrom through an opening or openings 39 in the bottom wall 31 of the guide member 29, and so, at proper times, to oppose the bolt receiving notch or notches 17 provided in the end wall 15 of the container neck portion 11. Means are provided to prevent rotative displacement of the bolt piece 32, whereby to avoid any tendency of the bolt tongue or tongues to exercise lateral binding thrust against the sides of the opening or openings 39 of the guide member 29 and of the notch or notches 17 of the container neck portion 11, when the tongue or tongues are caused to enter or withdraw from said notch or notches. Illustrative of means for such purpose, the bolt piece 32 is provided with diametrically spaced, upstanding guide pins 40 which slidably engage in correspondingly diametrically spaced slideway openings 41 which are provided in the wall of the lock housing 22 (see Fig. 5).

To apply and lock the closure cap 12 to the container 10, said cap is turned home on the container neck 11 until stopped. In its stopped position, the cap as thus applied, will be so disposed that the bolt tongues 38 of the locking mechanism thereof will be aligned in opposition to the notches 17 of the end wall 15 of the container neck. The cap being thus joined to the container in closed relation thereto, the key 24 is inserted in the key barrel 23, and thereupon turned clockwise. Such turning of the key rotates the key barrel 23, and thereby rotates the bolt piece 32 operating element 26 to cause its thrust arm 27 to ride over the cam portion 33 of the bolt piece, from the low point 34 of said cam portion to the high point 35 thereof, said thrust arm being thereupon stopped by abutment against the adjacent side of the stop projection 36. Such movement of the thrust arm 27 over the cam portion 33, effects a downward axial movement of the bolt piece 32 against the upthrusting tensional force of the compression spring 37. This downward movement of the bolt piece causes its bolt tongues 38 to enter the notches 17 of the container neck portion end wall 15, and thereby locks the cap 12 against releasing rotation relative to the container neck portion, thus preventing detachment and removal of the cap from the container (see Figs. 2, 4 and 5). The key 24 is thereupon withdrawn from the key barrel 23, whereupon the cap remains locked to the container against unauthorized removal therefrom, and consequently prevents unauthorized dispensing of the content of the container, or surreptitious tampering with said content. The advantage of this will be obvious, since it assures effective protection of the container content. Such protection is highly desirable when the content of the container is of poisonous character which must be kept inaccessible to children or other persons not intended to make use of the same; or when the content of the container is reserved for laboratory research use and must be adequately guarded against tampering; or when the content of the container is desired to be guarded against pilfering or theft. In fact, the content of the container is thus effectively protected against any unauthorized access thereto, as may be desirable to provide against under any conditions or for any reason.

To release the cap 12 for detachment and removal from the container, the key 24, being inserted in the key barrel 23, is turned counterclockwise, thereby rotating the key barrel and bolt piece operating means 26, so as to cause the thrust arm 27 of the latter to move from the high point 35 to the low point 34 of lock piece cam portion 33, and to stopped position abutting the opposite side of the stop projection 36. Such movement of the thrust arm 27 relaxes downward thrusting pressure against the lock piece 32, so that the compression spring 37 will cause the latter to rise, and thus to withdraw the bolt tongues 38 from the notches 17 of the container neck portion end wall 15 (see Fig. 6). The bolt tongues 38 being withdrawn from the notches 17, the cap 12 is freed for such rotation upon the container neck portion 11 as will disconnect the same from the latter, thus permitting removal of the cap so that the container is opened for dispensing its content, or to give access to said content.

It is realized that changes may be made in the illustrated and above described embodiment of this invention within the principles and scope of this invention as defined by the herefollowing claims, said embodiment of the invention being intended to be considered as illustrative and not in a limiting sense.

Having now described my invention, I claim:

1. In combination, a container having a neck portion, a closure cap applicable to said container neck portion, said container neck portion and cap having cooperative means operative by rotation of the latter relative to the former whereby to join said cap in closed relation to the container, and means to releasably secure the thus joined cap against unauthorized removal from the container comprising an axially movable bolt piece having bolt tongue means dependent therefrom, guide means for said bolt piece fixed within the cap, said guide means including a bottom wall through which the bolt tongue means can be projected, said bolt piece having an upstanding cam member, a key actuatable lock comprising a housing affixed to the cap above said bolt piece, a key barrel rotatably supported by said housing, a bolt piece operating means connected with said key barrel to rotate therewith and including a radial thrust arm to operatively engage said cam member, spring means interposed between the guide means bottom wall and the bolt piece to urge the latter and its cam member toward said thrust arm for operative engagement thereby, and said container neck portion having means to receive the bolt tongue means when the bolt piece is downwardly moved to locking position.

2. The combination defined by claim 1 which further includes means to retain the axially movable bolt piece against rotative displacement.

3. In combination, a container having an externally screw threaded neck portion, a closure cap having an internally screw threaded dependent skirt portion to engage said container neck portion, whereby to detachably join said cap in closed relation to the container, and means to releasably secure the thus joined cap against unauthorized removal from the container comprising an axially movable bolt piece having diametrically spaced bolt tongues dependent therefrom, said container neck portion having a perforate end wall bridging the mouth thereof and provided with diametrically spaced notches to receive said bolt tongues when the bolt piece is moved to locking position, said bolt piece having an upstanding cam member, a key actuatable lock comprising a housing at the upper end of the cap, a key barrel rotatably supported by said housing, and bolt piece operating means connected with the inner end of said key barrel to rotate therewith and including a radial thrust arm to operatively engage said cam member with bolt piece moving effect.

4. In combination, a container having an externally screw threaded neck portion, a closure cap having an internally screw threaded dependent skirt portion to engage said container neck portion, whereby to detachably join said cap in closed relation to the container, and means to releasably secure the thus joined cap against unauthorized removal from the container comprising an axially movable bolt piece having diametrically spaced bolt tongues dependent therefrom, said container neck portion having a perforate end wall bridging the mouth thereof and provided with diametrically spaced notches to receive said bolt tongues when the bolt piece is moved to locking position, said bolt piece having an upstanding cam member, a key actuatable lock comprising a housing at the upper end of the cap, a key barrel rotatably supported by said housing, and bolt piece operating means connected with the inner end of said key barrel to rotate therewith and including a radial thrust arm to operatively engage said cam member with bolt piece moving effect, whereby to downwardly move the bolt piece to locking position when the key barrel is key turned in one direction, and spring means to retract the bolt piece from locking position when the key barrel is key turned in the opposite direction.

References Cited in the file of this patent
UNITED STATES PATENTS

| | | |
|---|---|---|
| 738,917 | Kempien | Sept. 15, 1903 |
| 1,895,963 | Bates | Jan. 31, 1933 |
| 2,634,598 | Kaiser | Apr. 14, 1953 |